(12) United States Patent
Lindvall

(10) Patent No.: US 7,287,641 B2
(45) Date of Patent: Oct. 30, 2007

(54) FRICTION DRIVE DEVICE FOR A CONVEYOR AND METHOD FOR DRIVING

(76) Inventor: Tommy Lindvall, Kvie Ekeby, S-621 70 Visby (SE)

( * ) Notice: Subject to any disclaimer, the term of this patent is extended or adjusted under 35 U.S.C. 154(b) by 5 days.

(21) Appl. No.: 10/576,155

(22) PCT Filed: Oct. 14, 2004

(86) PCT No.: PCT/SE2004/001478

§ 371 (c)(1),
(2), (4) Date: Apr. 17, 2006

(87) PCT Pub. No.: WO2005/037690

PCT Pub. Date: Apr. 28, 2005

(65) Prior Publication Data

US 2007/0137986 A1    Jun. 21, 2007

(30) Foreign Application Priority Data

Oct. 16, 2003   (SE)   .................... 0302734

(51) Int. Cl.
*B65G 23/38* (2006.01)
(52) U.S. Cl. ................................. 198/832.1
(58) Field of Classification Search ............. 198/832.1
See application file for complete search history.

(56) References Cited

U.S. PATENT DOCUMENTS 1,946,452 A      6/1934  Bridges
3,417,853 A  *  12/1968  Mojden et al. ............. 198/444
4,432,450 A  *   2/1984  Dorigo ....................... 198/832
4,787,128 A  *  11/1988  Wickham .................... 29/33 P
5,755,548 A  *   5/1998  Gaasch et al. .............. 414/415
6,513,649 B1 *   2/2003  Lauzon et al. ........... 198/832.1

FOREIGN PATENT DOCUMENTS

| JP | 62096215 A | * | 5/1987 |
| RU | 2038996 | | 7/1995 |
| SE | 436019 | | 11/1984 |
| WO | WO 02071836 | | 9/2002 |

OTHER PUBLICATIONS

International Search Report; PCT/SE2004/001478; Feb. 2, 2005.

* cited by examiner

*Primary Examiner*—Mark A Deuble
(74) *Attorney, Agent, or Firm*—Cantor Colburn LLP

(57) ABSTRACT

The invention relates to a drive device for intermittent driving of a conveyor that partly surrounds a drum rotatable around a centre axis. The drive device includes drive member and motion transmission member. According to the invention, the drive member is arranged to execute a reciprocating motion. The motion transmission member, in the motion of the drive member in a first direction, is arranged to impart the drum a rotary motion in a first rotary direction and impart the conveyor a motion. Further, the motion transmission member, in the motion of the drive member in a second direction, is arranged to impart the drum a rotary motion in a second rotary direction in such a way that the conveyor is at rest. The invention also relates to a corresponding method.

10 Claims, 2 Drawing Sheets

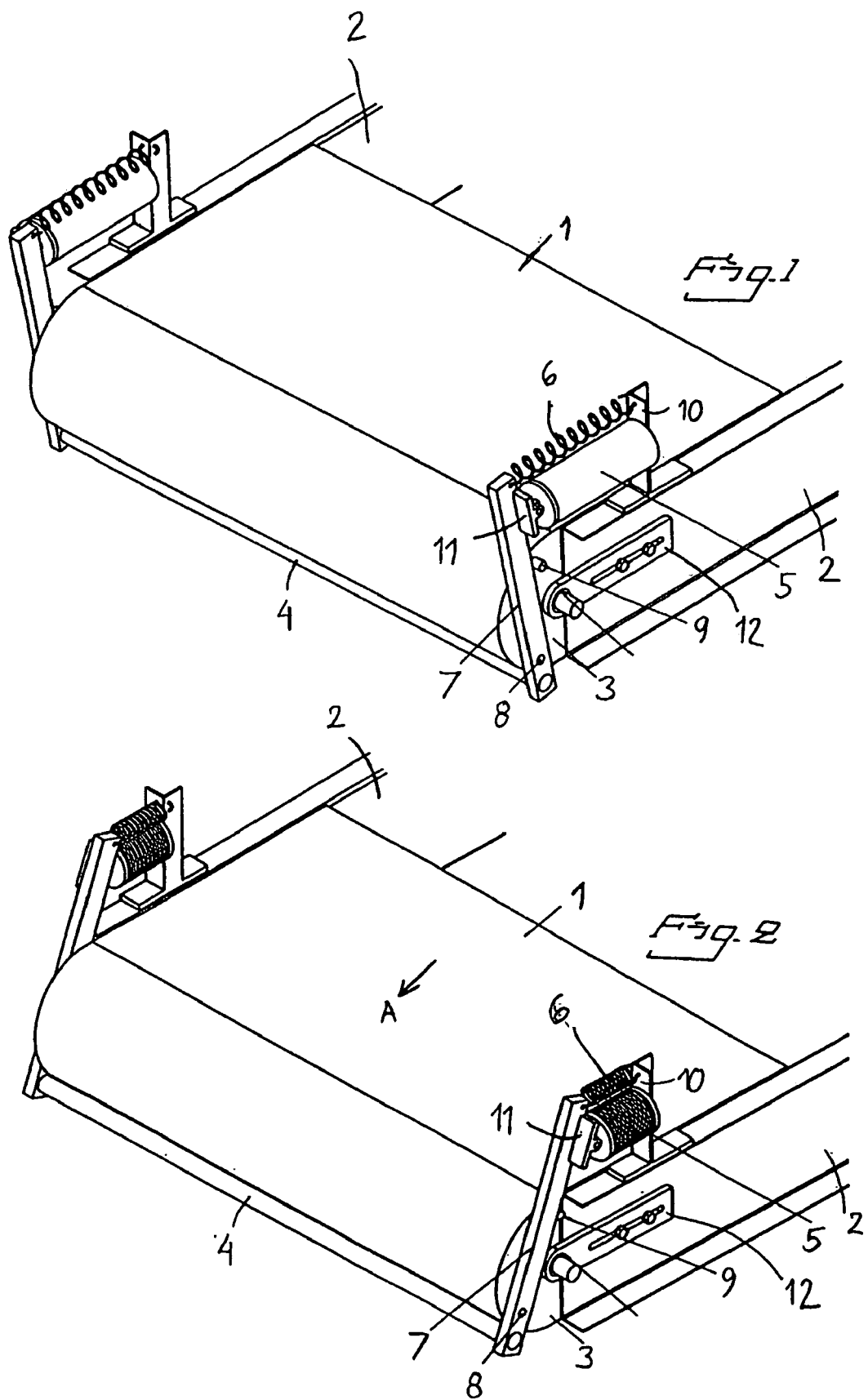

FRICTION DRIVE DEVICE FOR A CONVEYOR AND METHOD FOR DRIVING

FIELD OF THE INVENTION

From a first aspect, the present invention relates to a drive device for intermittent driving of a conveyor that partly surrounds a drum rotatable around a centre axis, which drive device comprises drive member and motion transmission member.

From a second aspect, the invention relates to a method for driving such a conveyor.

BACKGROUND OF THE INVENTION

Conveyors of the type in question are used in many different applications. Such a one is in animal farming such as of, e.g., cattle and pigs. In such an application, it is previously known to form animal-farming spaces with movable floor, with the floor consisting of such a conveyor for the removal of the dung and/or feed of fodder. Consequently, in this application the conveyor has a considerable width and is driven slowly and intermittently. A conveyor in such an application is disclosed, e.g., in WO 02/071836.

In many cases, a conveyor running over a drum shows a tendency of being displaced laterally along the same. Occasionally, large forces are required in order to counteract this and hold the belt in place. It may be particularly difficult if the belt is wide and of steel, as usual in the application mentioned above. Measures in order to, in that way, retain the belt may become cost-demanding and cause friction loss and belt wear. Another possibility is to let the drum rotate in the opposite direction at regular intervals, a laterally retrograde motion of the belt being obtained. The disadvantage, though, is that the conveyor trails in a backward motion in the conveying direction.

In these circumstances, the object of the present invention is to provide a drive device for a conveyor of the kind in question and a method for driving such a one that brings about correction of the lateral position of the belt on the drum without the occurrence of the disadvantages pointed out above.

SUMMARY OF THE INVENTION

In the first aspect of the invention, the object set up has been attained by the fact that a drive device of the kind defined in the preamble of claim 1 comprises the special features that the drive member is arranged to execute a reciprocating motion that the motion transmission member, in the motion of the drive member in a first direction, is arranged to impart the drum a rotary motion in a first rotary direction and impart the conveyor a motion that the motion transmission member, in the motion of the drive member in a second direction, is arranged to impart the drum a rotary motion in a second rotary direction in such a way that the conveyor is at rest.

By the fact that the drum thereby is imparted a reciprocating rotary motion, a correction of possible lateral motion of the belt upon each returning rotary motion is brought about. Thanks to the belt during the returning motion of the drum being kept at rest, a unidirectional motion is maintained so that backward conveyance of goods is avoided. By the fact that the drive device thereby fulfills the double function of driving the belt in the intended conveying direction as well as providing correction against lateral motion, large cost savings in comparison with having separate drive device and correction device are attained.

According to a preferred embodiment of the invented drive device, the rotary motion of the drum is substantially equally large in both rotary directions. Thereby, optimum correction of the lateral displacement is attained.

According to an additional preferred embodiment, the drive member comprises a pressure-actuated bellows and a mechanical spring. Accordingly, the stated reciprocating motion of the drive member is attained in a very simple and expedient way. The same gets a minimum number of movable parts and becomes robust and insensitive to disturbances. For instance, the bellows may be made as a woven hose similar to a firehose, and a tension spring may be arranged parallel to the bellows. Of course, alternatively a compression spring may be used. Further, the bellows may by itself be formed with resilient properties, the need for an additional spring being eliminated.

According to an additional preferred embodiment, the motion transmission member comprises:
an arm connected with the drive member,
a pressure element connected with the arm,
a neck arranged on at least one of the end surfaces of the drum, in which neck the arm is rotatably mounted, and
a carrier member arranged on said end surface,
in the motion of the drive member in said first direction, the arm being arranged to initially displace the pressure element to abutment against the conveyor and then by means of the abutting pressure element impart the conveyor said motion and simultaneously via the neck and the pressure element impart the drum a rotary motion in said first rotary direction,
and in the motion of the drive member in said second direction, the arm being arranged to initially displace the pressure element from abutment against the conveyor as well as being brought to abutment against the carrier member and then via the carrier member and the neck impart the drum a rotary motion in said second rotary direction.

Such a formed motion transmission member provides the stated motion pattern by means of very few movable parts and with uncomplicated co-operation thembetween. This entails that the device becomes inexpensive to manufacture as well as in maintenance. The simplicity also entails great operational reliability even in heavily dirty surroundings, which frequently may be at hand.

According to an additional preferred embodiment, the carrier member and the connection of the drive member with the arm are located on one side of a plane through the centre axis of the drum, and the neck and the pressure element are located on the opposite side. Accordingly, an efficient transfer of force is attained by the use of leverage.

According to an additional preferred embodiment, the pressure element is rod-shaped and parallel to the drum and extends along the major part of the length of the drum. Thanks to such an extension in the longitudinal direction, the force becomes distributed over a large area so that concentrated loads are avoided and so that obliquely directed forces are avoided.

According to an additional advantageous embodiment, the drive member is controlled to alternate between inactive, relatively long periods, when it is idle, and active, relatively short periods when it executes some strokes. This makes the invention expedient to utilize in applications where conveyance of material is required only during certain short periods.

According to an additional preferred embodiment, the conveyor is a movable floor of an animal-farming unit. The present invention is primarily developed for use in such an application, and the advantages thereof are particularly valuable in this connection.

The above-mentioned preferred embodiments of the invented drive device are defined in the claims depending on claim 1.

In the second aspect of the invention, the object set up has been attained by the fact that a method of the kind defined in the preamble of claim 9 comprises the special measures that the drive takes place while alternating between a first and a second stage, during the first stage the drum being imparted a motion in a first rotary direction while the conveyor being imparted a motion, and during the second stage the drum being imparted a motion in a second rotary direction while the conveyor being kept at rest.

According to preferred embodiments of the invented method, this is exercised by means of the invented drive device and particularly by means of anyone of the preferred embodiments of the same.

Accordingly, advantages of the corresponding types that have been accounted for above regarding the invented drive device are gained.

The invention is explained closer by the appended detailed description of preferred embodiment examples of the same, reference being made to the appended drawing figures.

BRIEF DESCRIPTION OF THE FIGURES

FIG. 1 is a perspective view of a drive device according to the invention in a first end position.

FIG. 2 is a corresponding perspective view in a second end position.

In FIG. 1, the invented drive device arranged for driving a conveyor 1 is illustrated, which in this example consists of a movable floor in an animal-farming device. The conveyor 1, which may be of steel, runs between two parallel beams 2, and immediately under the conveyor 1 there is a (not shown) fixed supporting floor. In the longitudinal direction, the conveyor is bent 180° around a drum 3 at the drive end and is correspondingly bent 180° over a drum at the opposite (not shown) end of the equipment.

Figure 3:
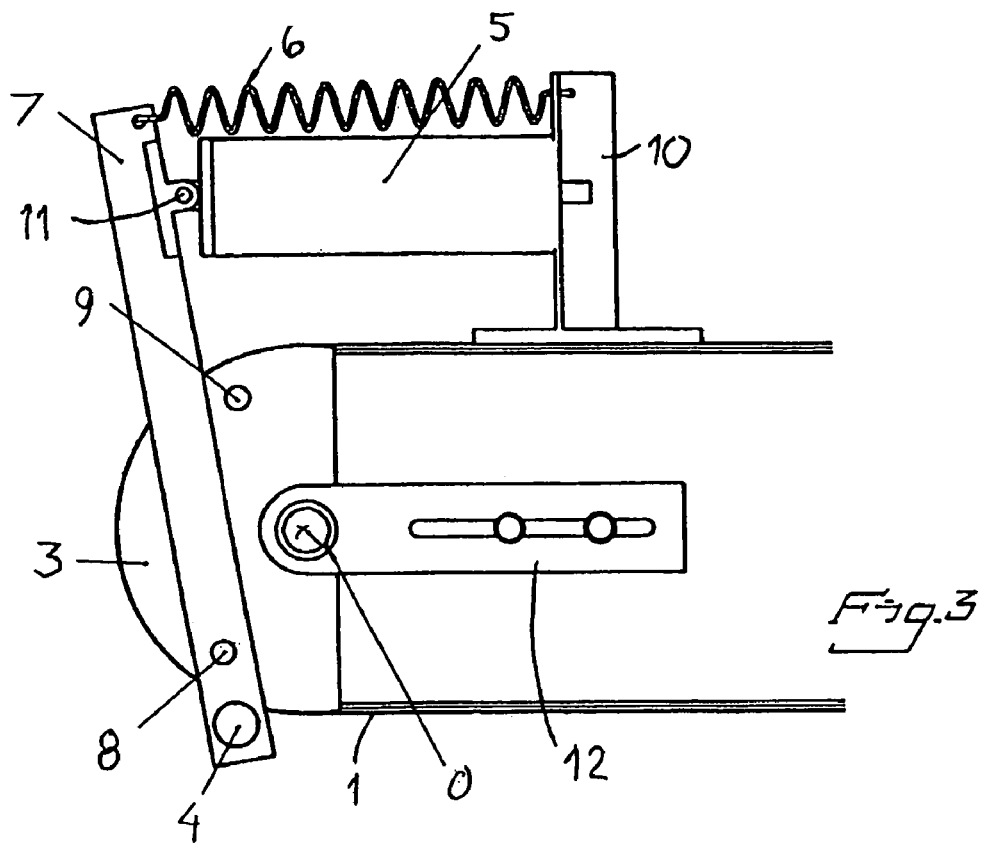
FIG. 3 is a side view of the drive device in the position shown in FIG. 1.

The drum 3 constitutes the drive drum of the conveyor, and the same drum is driven by means of the drive device so that the drum 3, during short periods, executes some reciprocating rotary motions and so that the conveyor, in that connection, moves intermittently in the direction of the arrow A.

The drive device comprises a unit at each end of the drum 3 and a rod that connects the same and runs parallel to the drum 3.

Each unit comprises a bellows 5 and a tension spring 6 and an arm 7 connected with these, which arm at the opposite end thereof is connected with the rod 4. The arm 7 is rotatably mounted on an axle journal 8 attached to the end surface of the drum 3. Further, on the end surface of the drum there is a carrier member 9 in the form of a protruding pin.

The figure shows the drive device in a first end position when the bellows 5 is fully expanded.

FIG. 2 shows the drive device in the opposite end position, the bellows 6 being entirely compressed.

Figure 4:
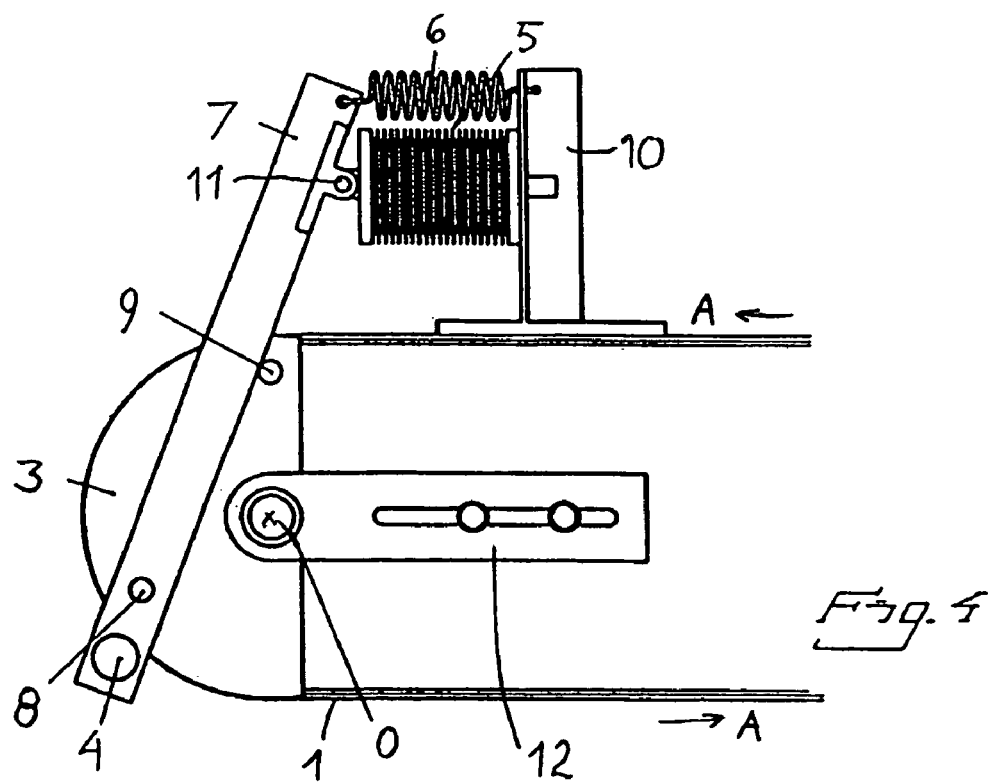
FIG. 4 is a side view of the drive device in the position shown in FIG. 2.

The mode of operation of the drive device is most clearly seen in FIGS. 3 and 4.

In FIG. 3, the drive device is in the same end position as is shown in FIG. 1. The bellows 5 is arranged between a fixed strut 10 and a jointed connection device 11 at the arm 7. At the strut 10, the bellows is connected to an air pipe for the supply of compressed air. However, the same is not shown in the figure. The tension spring 6 is attached to the strut 10 with one end thereof and to the arm 7 with the other end thereof.

When the bellows 5 is decompressed, the spring 6 will pull the upper end towards the right in the figure. This entails that the arm initially will be rotated clockwise around the axle journal 8. During this initial rotation, the rod 4, which in the figure abuts against the belt 1, will be released from the abutment against the belt. The initial rotation is stopped shortly afterwards by the fact that the arm 7 has been rotated to abutment against the carrier member 9. When the spring 6 then continues to pull the upper end of the arm 7 towards the right, the connection of the arm with the drum 3 via the axle journal 8 and the carrier member 9 entails that the drum is rotated clockwise. The friction between the drum 3 and the belt 1 is, in that connection, not sufficient in order to transmit motion to the belt 1, which consequently is at rest during this phase.

After completed compression of the bellows, the position shown in FIG. 4 is attained. When this is attained, the supply of compressed air to the bellows 5 is activated, which on that occasion, while overcoming the tensile force from the spring 6, pushes the upper end of the arm towards the left in the figure. In that connection, initially the arm 3 will execute a rotary motion around the axle journal 8 counter-clockwise and leaves abutment against the carrier member 9. Shortly afterwards, in that connection, the rod 4 has been rotated to abutment against the belt 1, continued rotation around the axle journal 8 being prevented. Continued displacement of the upper end of the arm 7 towards the left entails therefore that the arm 7 rotates the drum counter-clockwise via the axle journal 8 and the abutment of the rod 4 against the belt 1. In that connection, the rod 4 will be pressed by large force against the belt 1 so that the same is pressed between the rod 4 and the drum 3. When the drum 3 rotates in this phase, therefore also the belt will trail the motion in the conveying direction A. Eventually, the position-shown in the figure is attained once again and the motion cycle is repeated.

Consequently, the result of some motion cycles becomes that the drum is rotated reciprocating some times while the conveyor moves unidirectionally and intermittently forward. The rotary motion is relatively limited, normally less than 30°. Therefore, the drum 3 does not need to be circular cylindrical but it is enough that it has a winding of about 210°, such as is the case with the drum shown in the figures.

The position of the centre axis 0 of the drum can be adjusted by means of a belt tension device 12.

As mentioned, the embodiment example shown in the figures relates to an application where the conveyor 1 consists of a movable floor of an animal-farming device. The same may be an individual box or a larger space for a plurality of animals. Here, the object of the conveyor 1 is to convey away dung and/or feed fodder, bedding and the like. Consequently, here the conveyance operation is limited and the speed of motion is small. This means that the device is inactive during the major part of the time. It may be suitable that periods of about 30 min inactivity alternate with periods of some or a few minutes when the device is active and executes a number of strokes.

The invention claimed is:

1. Drive device for intermittent driving of a conveyor that partly surrounds a drum rotatable around a centre axis, which drive device comprises drive member and motion transmission member
   wherein the drive member is arranged to execute a reciprocating motion;
   wherein the motion transmission member, in the motion of the drive member in a first direction, is arranged to impart the drum a rotary motion in a first rotary direction and impart the conveyor a motion; and
   wherein the motion transmission member, in the motion of the drive member in a second direction, is arranged to impart the drum a rotary motion in a second rotary direction in such a way that the conveyor is at rest.

2. Drive device according to claim 1, wherein the rotary motion of the drum is substantially equally large in both rotary directions.

3. Drive device according to claim 1, wherein the drive member comprises an air-operated bellows and a mechanical spring.

4. Drive device according to claims 1, wherein the motion transmission member comprises
   an arm connected with the drive member,
   a pressure element connected with the arm,
   a neck arranged on at least one of the end surfaces of the drum, in which neck the arm is rotatably mounted, and
   a carrier member arranged on said end surface,
   wherein, in the motion of the drive member in said first direction, the arm being arranged to initially displace the pressure element to abutment against the conveyor and then by means of the abutting pressure element impart the conveyor said motion and simultaneously via the neck and the pressure element impart the drum a rotary motion in said first rotary direction,
   and wherein in the motion of the drive member in said second direction, the arm being arranged to initially displace the pressure element from abutment against the conveyor as well as being brought to abutment against the carrier member and then via the carrier member and the neck impart the drum a rotary motion in said second rotary direction.

5. Drive device according to claim 4, wherein the carrier member and the connection of the drive member with the arm are located on one side of a plane through the centre axis of the drum, and the neck and the pressure element are located on the opposite side of said plane.

6. Drive device according to claim 4, wherein the pressure element is rod-shaped and parallel to the drum and extends along a major part of the length of the drum.

7. Drive device according to claim 4, wherein the conveyor is a movable floor of an animal-farming unit.

8. Drive device according to claim 1, wherein the drive member is controlled to alternate between inactive, relatively long periods, when it is idle, and active, relatively short periods when it executes some strokes.

9. Method for intermittent driving of a conveyor that partly surrounds a drum rotatable around a centre axis, comprising the drive taking place while alternating between a first and a second stage, during the first stage the drum being imparted a motion in a first rotary direction while the conveyor being imparted a motion, and during the second stage the drum being imparted a motion in a second rotary direction while the conveyor being kept at rest.

10. Method according to claim 9, wherein the method is exercised by means of a drive device according to claim 1.

* * * * *